United States Patent [19]

Sugiyama

[11] Patent Number: 5,777,711
[45] Date of Patent: Jul. 7, 1998

[54] LIQUID CRYSTAL DISPLAY HAVING BALANCED CUTS IN ELECTRODES

[75] Inventor: Takashi Sugiyama, Kawasaki, Japan

[73] Assignee: Stanley Electric Co., Ltd., Tokyo, Japan

[21] Appl. No.: 805,560

[22] Filed: Feb. 25, 1997

[30] Foreign Application Priority Data

Feb. 27, 1996 [JP] Japan ................. 8-040163

[51] Int. Cl.$^6$ ............................................. G02F 1/1343
[52] U.S. Cl. ................................ 349/143; 349/145
[58] Field of Search ............................ 349/143, 145, 349/139

[56] References Cited

U.S. PATENT DOCUMENTS

| | | | |
|---|---|---|---|
| 4,624,530 | 11/1986 | Takahara et al. | 349/146 |
| 5,136,407 | 8/1992 | Clerc | 349/146 |
| 5,309,264 | 5/1994 | Lien et al. | 349/143 |

FOREIGN PATENT DOCUMENTS

| | | |
|---|---|---|
| 0 445 777 A2 | 9/1991 | European Pat. Off. . |
| 0 636 917 A1 | 2/1995 | European Pat. Off. . |

Primary Examiner—Anita Pellman Gross
Attorney, Agent, or Firm—Frishauf, Holtz, Goodman, Langer & Chick

[57] ABSTRACT

A liquid crystal display having a pair of substrates disposed to face each other, two groups of crossing electrodes mounted on the pair of substrates, and a liquid crystal layer disposed between the two groups of electrodes, wherein display is controlled by voltage applied across the two groups of electrodes. Elongated cut portions are formed in edge portions of each electrode of one group. Cut portions are formed laterally and alternately at the opposite edge portions. The position of each cut portion is overlapped with the edges of adjacent electrodes of the other group. A reduction of transmittance is suppressed and the wide visual angle characteristics are retained. An increase in electrode resistance by cut portions is suppressed to prevent display quality degradation such as display irregularity.

9 Claims, 5 Drawing Sheets

LIQUID CRYSTAL DISPLAY HAVING BALANCED CUTS IN ELECTRODES

BACKGROUND OF THE INVENTION a) Field of the Invention

The present invention relates to a liquid crystal display, and more particularly to a liquid crystal display excellent in display quality such as contrast.

b) Description of the Related Art

FIG. 3 shows an example of a homeotropic, electrically controlled birefringence (ECB) mode liquid crystal display (LCD) according to the related art. Liquid crystal molecules 10 are oriented vertical to the planes of upper and lower substrates 11 and 12 when no voltage is applied, and tilted in some radial direction in the substrate plane when voltage is applied. Such an LCD with orthogonal Nicol's configuration polarizers 13 and 14 is known as having a high contrast display.

This ECB mode is, however, associated with the following disadvantages.

(1) Since liquid molecules 10 are tilted in some direction when voltage is applied, the LCD has a dependency on a view angle (direction of an observer relative to the normal of display panel). This reason is illustrated in FIG. 4. Each liquid crystal molecule is elongated and has a larger refractive index along its director than a direction perpendicular to the director. If liquid crystal molecules are vertical to the planes of substrates, the refractive index distribution is in axial symmetry with a substrate normal. However, this axial symmetry is broken if liquid crystal molecules are tilted in some direction. In other words, retardation values of a liquid crystal layer become different depending upon a view angle (indicated by arrows).

(2) A pre-tilt angle θ in an in-plane (azimuthal) direction is given in some cases to each liquid crystal molecule 10 in order to tilt the molecule in one in-plane direction when voltage is applied. FIG. 5 shows a liquid crystal cell with a pre-tilt angle when voltage is not applied. Since each liquid crystal molecule 10 is not perfectly homeotropic when no voltage is applied, a sufficient black level cannot be obtained and contrast is lowered.

(3) As voltage is applied, liquid crystal molecules tilt, starting from those positioned at the middle portion of the cell, and the retardation value gradually changes to raise transmittance. Sharpness of a transmittance change with voltage is more gentle than STN-LCD. Therefore, in simple matrix drive with a large duty ratio, contrast is low and transmittance in a bright state is low.

(4) The disadvantage (3) can be mitigated by thickening a cell. However, a thick cell lowers response speed.

A liquid crystal display capable of improving the visual angle characteristics described in the above (1) is disclosed in U.S. Pat. No. 5,136,407 assigned to the same assignee as the present application and issued on Aug. 4, 1992, which is herein incorporated by reference. According to this United States patent, an elongated aperture (slit) is formed in one of opposing electrodes, in the direction along the edge of the other electrode and centrally to a crossing area (display pixel area) of the electrodes. This aperture makes liquid crystal molecules in the pixel area tilt in two or more directions to realize a wide view angle. The embodiment described in this United States patent will be briefly described with reference to FIGS. 6A to 6C.

FIG. 6A is a perspective view showing the structure of a dot matrix type liquid crystal display described in U.S. Pat. No. 5,136,407. A pair of glass substrates 11 and 12 are disposed to face each other and define a space having a predetermined gap for accommodating liquid crystal. On the lower glass substrate 11, a plurality of parallel common electrodes 16 are disposed. In each common electrode, an elongated aperture (slit) 18 is formed perpendicular to the longitudinal direction of the common electrode 16. A plurality of narrower parallel segment electrodes 17 are disposed on the surface of the upper glass substrate 12, perpendicular to the direction of the common electrodes 16. Orthogonal Nicol's configuration polarizers 13 and 14 are mounted on the outer surfaces of the substrates 11 and 12.

The direction of the electric field in this, electrode structure at the cross section along line A—A' of FIG. 6A is shown in FIG. 6B. Electric force lines indicated by arrows are generated between the electrodes 16 and 17 outside of the aperture 18 so that the tilt direction of liquid crystal molecules can be controlled in two different directions. The electric field distribution at the cross section along line B—B' of FIG. 6A is shown in FIG. 6C. The directions of electric force lines are as indicated by arrows. The direction of electric field regulating the tilt direction of liquid crystal molecules is definitely oriented in two different directions at the opposite end areas of each peripheral portion of the common electrode. However, at the intermediate area between these opposite end areas, the electric field gradually changes its direction. This change in the electric field makes it impossible to control liquid crystal molecules to be oriented in predetermined directions. Further, an area where liquid crystal molecules do not tilt may be formed or an area having a distribution of tilt directions may be formed.

In such areas, a relationship between the tilt direction of liquid crystal molecules and a polarizing axes of polarizers disposed outside of the cell is locally and unstably shifted from 45 degrees (which is an optimum angle providing a maximum efficiency from the viewpoint of transmittance). Therefore, a cell transmittance is lowered.

If the tilt direction of liquid crystal molecules at the edge of the aperture 18 is controlled to be about 45 degrees, for example, the electrode edge at the aperture 18 is required to be displaced from the center of the aperture 18 by a width (corresponding to a shift between edges of the upper and lower electrodes) generally the same as the cell thickness. In the above slit structure, since the electric field is controlled at the right and left areas of the slit 18 as shown in FIG. 6B, a slit width about two times the cell thickness is required. A typical cell thickness is generally about 5 μm. Therefore, the slit width is about 10 μm which is 10% or more of the pixel width of about 90 μm.

Since the transparent electrode is removed from this slit area, sufficient display is not possible in this slit area. In the above example, the slit 18 sacrifices an aperture efficiency by about 10% which is one of the reasons of lowered transmittance. Examples of sizes of the electrodes of the above slit structure are shown in FIG. 7.

The slit 18 of U.S. Pat. No. 5,136,407 forms a very narrow electrode portion C (FIGS. 6A and 7) on both sides of the slit 18 in the common electrode 16. Therefore, there is an increase in resistance of the electrode at this portion C. This resistance increase may cause display irregularity or crosstalk.

SUMMARY OF THE INVENTION

It is an object of the present invention to suppress a reduction of transmittance as much as possible and maintain the wide angle of field of view (wide visual angle) to thereby improve the liquid crystal display with slits in electrodes disclosed in U.S. Pat. No. 5,136,407.

It is another object of the present invention to prevent lowering display quality such as display irregularity by suppressing an increase in electrode resistance.

According to one aspect of the present invention, there is provided a liquid crystal display having a pair of substrates disposed to face each other, two groups of crossing electrodes mounted on the pair of substrates, and a liquid crystal layer disposed between the two groups of electrodes, wherein display is controlled by voltage applied across the two groups of electrodes crossing and facing each other. An elongate cut portion is formed in each electrode of one of the two electrode groups, at edge portions of the electrode along a direction of an edge of an electrode of the other group. Cut portions are formed alternately at the opposite edge portions of the electrode. The position of each cut portion is overlapped with the edge of an electrode of the other group.

Such cut portions formed in an electrode of one group produces the fringe effect of electric field between the edge portion of each cut portion in an electrode of one group and the opposing electrode of the other group. Therefore, the orientation of liquid crystal molecules can be controlled only in two different directions in the pixel area where the electrodes of two groups cross each other.

As above, by utilizing a fringe electric field at the cut portion, transmittance of each cell of a liquid crystal display can be improved. A width (a shift amount between edges of upper and lower electrodes) of an area for controlling electric field at the cut portion is sufficient if it is about a cell thickness, because this area is required to control the electric field only at one side edge. Therefore, a removed electrode in one pixel is a half of the slit width of the conventional slit structure, so that an aperture efficiency can be less sacrificed correspondingly. Therefore, transmittance can be improved also by this effects.

Further, since there is no very narrow electrode as in the case of a conventional slit-structure, an increase in resistance and associated display irregularity and crosstalk can be less produced.

DETAILED DESCRIPTION OF THE PREFERRED EMBODIMENTS

FIGS. 1A to 1D show the electrode structure of a liquid crystal display according to an embodiment of the invention.

Figure 6A:
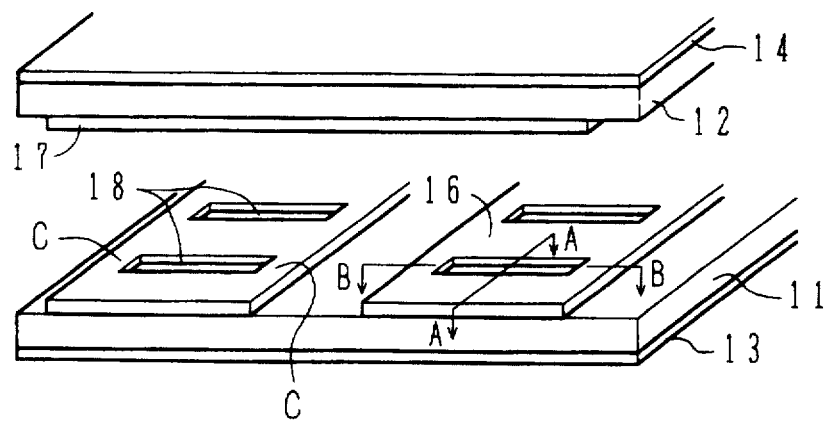
FIGS. 6A to 6C are a perspective view of a conventional liquid crystal display having slits in electrodes and cross sectional views illustrating electric field directions.
Figure 6B:
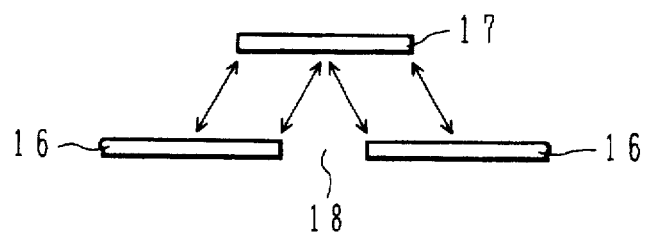
Figure 6C:
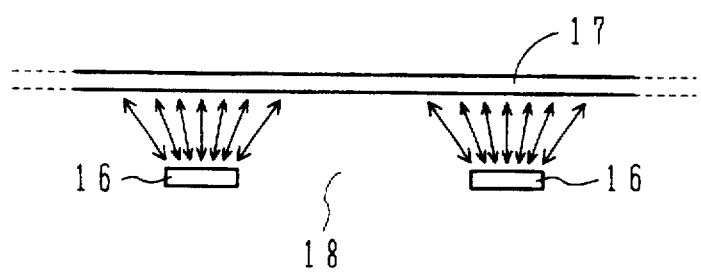

In the following description of the embodiment, although substrates, polarizers, and the like are not described or shown, they may take the same structures as shown in FIGS. 6A to 6C.

Figure 1A:
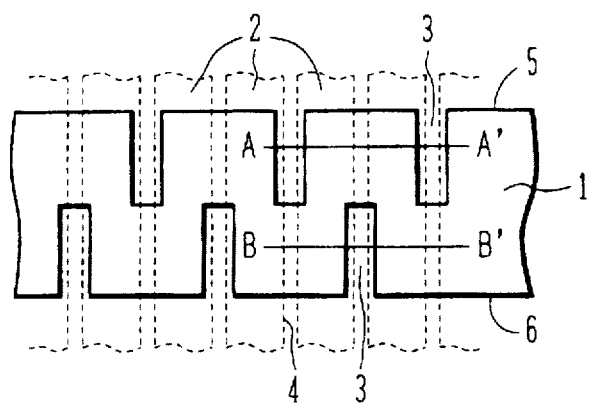
FIGS. 1A to 1D are diagrams illustrating an electrode structure of a liquid crystal display and orientation states of liquid crystal molecules, according to an embodiment of the invention.

FIG. 1A is a plan view showing the electrode structure at the electrode crossing area. A plurality of scan (common) electrodes 1 indicated by a solid line are formed on an unrepresented substrate, and a plurality of signal (segment) electrodes 2 indicated by a broken line and facing the scan electrode 1 are formed on another substrate. The scan electrodes 1 and signal electrodes 2 are disposed perpendicular to each other. The scan electrode 1 is formed with elongated cut portions 3, by removing the electrode material. Cut portions 3 are disposed alternately at opposing edges 5 and 6 of each scan electrode 1 along the longitudinal direction, the cut portions 3 being disposed in the direction along the edges 4 of the signal electrodes 2 and at a pitch of signal electrodes.

Figure 1B:
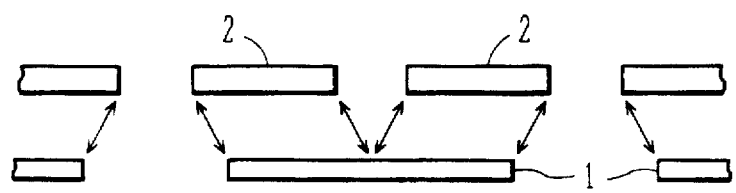
Figure 1C:
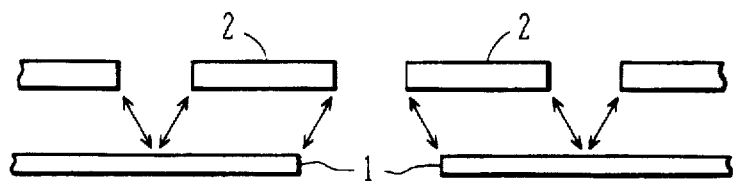

FIGS. 1B and 1C show the directions of electric fields at electrode edges in cross sections along lines A—A' and B—B' of FIG. 1A, the electric fields being indicated by arrows. The electric field directions at opposite edges of the signal electrode in each pixel area are parallel in both A—A' and B—B' cross sections, and the inclination directions of electric fields in one pixel area in upper cross section A—A' and lower cross section B—B' are opposite relative to the substrate normal.

Figure 1D:
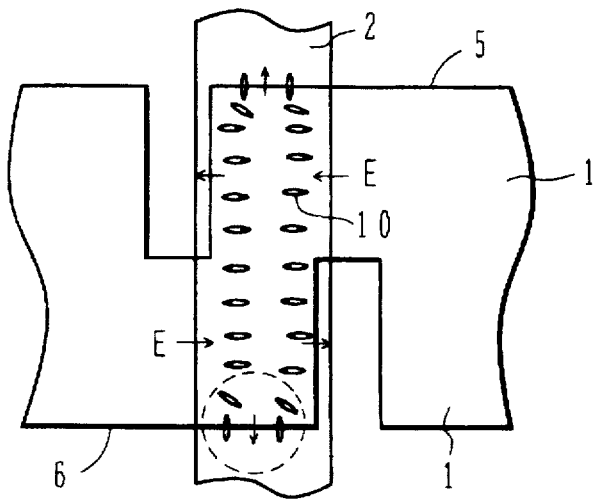

Therefore, as voltage is applied, liquid crystal molecules in one pixel area tilt in directions different by 180 degrees in an upper half area and in a lower half area (in upper and lower halves of a drawing sheet) relative to the center of the scan electrode 1. This orientation state is illustrated in FIG. 1D. In FIG. 1D, the black colored portion of each liquid crystal molecule indicates the tilt direction. It is seen that the liquid crystal molecules 10 are oriented in opposite directions in the upper and lower half areas by the applied electric field E. It is also seen from FIGS. 1B and 1C that the inclination relationship of liquid crystal molecules in adjacent right and left pixel areas is reversed.

In this embodiment, orthogonal Nicol's configuration polarizers are disposed on the outer surfaces of a pair of substrates, as shown in FIG. 6A, with their polarizing axes being maintained at 45 degrees relative to the longitudinal direction of the signal electrode 2. This polarization setting is most efficient for the orientation of liquid crystal molecules shown in FIG. 1D, from the viewpoint of transmittance.

Although the orientation of liquid crystal molecules changed by electric fields at the upper and lower edges 5 and 6 of the scan electrode 1 will be considered, this embodiment has basically no oblique electric fields, which are oppositely inclined (which generate opposite tilts), in a near distance range as in the slit structure shown in FIGS. 6A to 6C. The orientation change is only an azimuth angle (an in-plane direction shown in FIG. 1D). Therefore, an orientation change in a narrow area is also possible. Even in the neighborhood of the edges 5 and 6, as shown in an area surrounded by a dot line in FIG. 1D, the orientation change is continuous in a short distance.

Although the orientation is changed by 180 degrees at the interconnection of the upper and lower parts at the central area of a pixel, an elastic coefficient for twist is smaller than spray and bend so that an area required for an orientation change is narrow. Further, the main azimuth direction is hardly varied and adverse effects thereof are less. Therefore, a reduction of transmittance by liquid crystal molecules aligned along the polarization axis is minimum. In this embodiment, this reduction is negligible.

Figure 2:
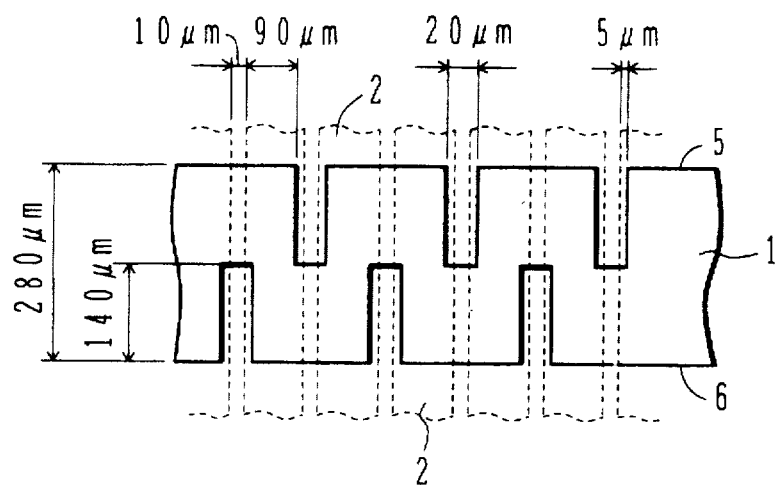
FIG. 2 is a diagram showing examples of sizes of parts of an electrode structure of this embodiment.
Figure 3:
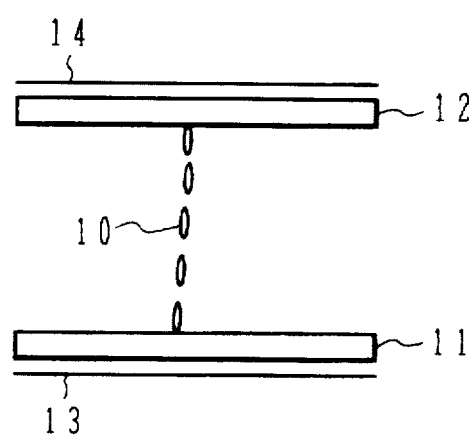
FIG. 3 is a diagram illustrating liquid crystal molecule orientation of a conventional homeotropic orientation type ECB mode LCD when no voltage is applied.
Figure 4:
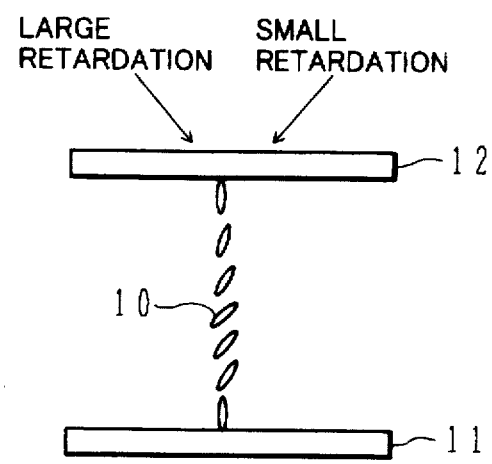
FIG. 4 is a diagram illustrating the visual angle dependence of retardation in a conventional ECB mode LCD.
Figure 5:
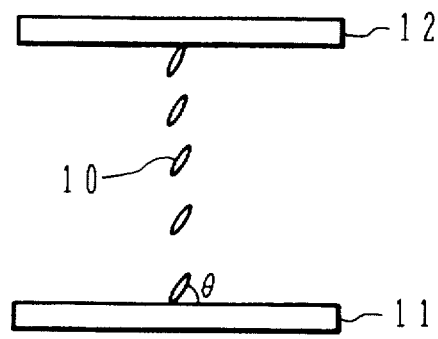
FIG. 5 is a diagram illustrating liquid crystal molecule orientation of a conventional ECB mode LCD with pre-tilt angle when no voltage is applied.

Examples of sizes of electrode parts of the liquid crystal display are shown in the plan view of FIG. 2. Cut portions, each having a width 20 μm and a length 140 μm are formed laterally in the scan electrode having a width of 280 μm, alternately at the opposite sides 5 and 6 at a pitch of 100 μm. Viewing a single side 5 or 6, the pitch becomes 200 μm. Although the cut portions 3 extend half way the width of the scan electrode from both sides, there is always left a conductive area of a half or more width. The electrode structure shown in FIG. 2 was formed on a pair of glass substrates, and homeotropic alignment films were formed (by coating and baking a homeotropic polyimide film) on the glass substrates. An empty cell was formed by stacking both the substrates while setting the cell thickness to 5 μm. The relationship between both the electrodes after stacking is the same as shown in FIG. 1A. Nematic liquid crystal having negative dielectric anisotropy was injected to form a liquid crystal display. The electrochemical characteristics of this liquid crystal display driven at a 1/240 duty were measured and the results shown in Table 1 were obtained. In Table 1, the characteristics of a liquid crystal display having the slit structure shown in FIG. 7 measured under the same conditions were shown for comparison.

TABLE 1

Figure 7:
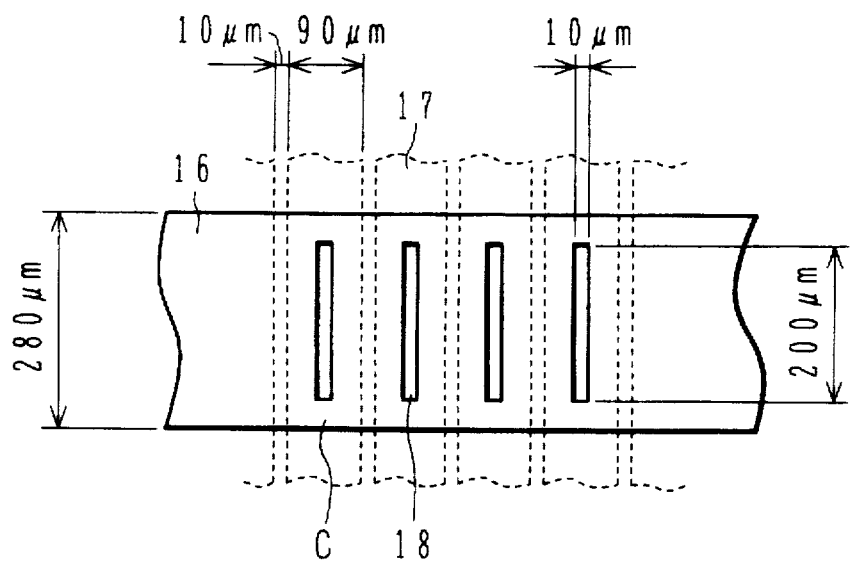
FIG. 7 shows examples of sizes of electrode parts of a liquid crystal display having the slit structure shown in FIG. 6A.

|  | Transmittance | Contrast |
| --- | --- | --- |
| Embodiment | 9.1% | 9.8 |
| FIG. 7 | 8.0% | 9.7 |

It is seen from the measurement results shown in Table 1 that the liquid crystal display of this embodiment has generally the same contrast as, and a larger transmittance than, the liquid crystal display having the slit structure shown in FIGS. 6A to 7. The visual angle characteristics were evaluated by human eyes. The evaluation showed that both the displays had a broad visual angle. Display irregularity and crosstalk recognized through visual evaluation were better than the slit structure.

Orientation of liquid crystal molecules in one pixel was observed with a polarizer microscope. Two orientation areas different by 180 degrees were observed, dividing a pixel in upper and lower areas.

The present invention has been described in connection with the preferred embodiments. The invention is not limited only to the above embodiments. For example, cut portions may be formed in either a scan electrode or in a signal electrode. It is apparent that various modifications, improvements, combinations, and the like can be made by those skilled in the art.

I claim:

1. A liquid crystal display comprising:

a pair of substrates disposed to face each other;

two groups of crossing electrodes mounted on the pair of substrates, the two crossing electrode groups facing each other at a first distance at a crossing area; and a liquid crystal layer disposed between the two groups of crossing electrodes, a display being controlled by voltage applied across the two groups of crossing electrodes which cross and face each other, wherein:

elongate cut portions are formed in each electrode of one of the two crossing electrode groups, at opposite edge portions of the electrode along a direction of an edge of an electrode of the other of the two crossing electrode groups, the cut portions are formed alternately at the opposite edge portions, and the position of each cut portion is at a central portion between neighboring cut portions on the other edge portion, and the position of each cut portion is overlapped with the edge of an electrode of the other crossing electrode group.

2. A liquid crystal display according to claim 1, wherein:

the other crossing electrode group is a group of a plurality of elongated parallel electrodes disposed at a predetermined pitch, and the cut portions of each electrode of the one crossing electrode group are disposed at the predetermined pitch, and the cut portions are disposed riding upon the edge portions of adjacent ones of the elongated electrodes of the other crossing electrode group.

3. A liquid crystal display according to claim 2, wherein the edge of each electrode of the other electrode group and the edge of each cut portion are displaced by a distance generally the same as the first distance in the width direction of the cut portion.

4. A liquid crystal display according to claim 2, wherein said cut portions on each of the opposite edge portions are disposed at a pitch which is at least twice as long as said predetermined pitch.

5. A liquid crystal display according to claim 1, wherein a length of the cut portion in the longitudinal direction of the other electrode group is about a half of the width of the one electrode group.

6. A liquid crystal display according to claim 1, wherein the one electrode group and the other electrode group are disposed perpendicular to each other.

7. A liquid crystal display comprising:

a pair of substrates disposed to face each other;

two groups of crossing electrodes mounted on the pair of substrates, the two crossing electrode groups facing each other at a first distance at a crossing area; and a liquid crystal layer disposed between the two groups of crossing electrodes, a display being controlled by voltage applied across the two groups of crossing electrodes which cross and face each other, wherein:

elongate cut portions are formed in each electrode of one of the two crossing electrode groups, at opposite edge portions of the electrode along a direction of an edge of an electrode of the other of the two crossing electrode groups, the cut portions are formed alternately at the opposite edge portions, the position of each cut portion is overlapped with the edge of an electrode of the other of the two crossing electrode groups, the other crossing electrode group is a group of a plurality of elongated parallel electrodes disposed at a predetermined pitch, and the cut portions of each electrode of the one crossing electrode group are disposed at the predetermined pitch, and the cut portions are disposed riding upon the edge portions of adjacent ones of the elongated electrodes of the other crossing electrode group.

8. A liquid crystal display according to claim 7, wherein the edge of each electrode of the other electrode group and the edge of each cut portion are displaced by a distance generally the same as the first distance in the width direction of the cut portion.

9. A liquid crystal display according to claim 7, wherein said cut portions on each of the opposite edge portions are disposed at a pitch which is at least twice as long as said predetermined pitch.

* * * * *